United States Patent [19]

Gaither

[11] Patent Number: 4,547,287
[45] Date of Patent: Oct. 15, 1985

[54] THERMOSTATICALLY CONTROLLED PACK HOLD-DOWN ASSEMBLY

[75] Inventor: John D. Gaither, West Salem, Ill.

[73] Assignee: Champion Laboratories, Inc., West Salem, Ill.

[21] Appl. No.: 587,071

[22] Filed: Mar. 7, 1984

[51] Int. Cl.⁴ ............................................. B01D 27/10
[52] U.S. Cl. .................................... 210/149; 210/196
[58] Field of Search ............... 210/130, 149, 184, 185, 210/196

[56] References Cited

U.S. PATENT DOCUMENTS

| 3,508,657 | 4/1970 | Cooper | 210/130 |
| 4,321,136 | 3/1982 | Matsui | 210/149 |
| 4,388,196 | 6/1983 | Lucia | 210/149 |
| 4,437,986 | 3/1984 | Hutchins et al. | 210/149 |
| 4,477,345 | 10/1984 | Szlaga, Jr. | 210/184 |
| 4,477,715 | 10/1984 | Bell et al. | 210/184 |

Primary Examiner—John Adee
Attorney, Agent, or Firm—Allegretti, Newitt, Witcoff & McAndrews

[57] ABSTRACT

A filter assembly comprises a housing, a liquid inlet in said housing, a liquid outlet in said housing, a filter pack in said housing, and valve means in said housing which is opened, for bypassing liquid about the filter pack when the liquid is cold and viscous and which is closed when the liquid is warmed and less viscous so that all liquid will pass through the filter pack. The liquid inlet and liquid outlet are each provided with one way check valves for controlling liquid flow into and out of the housing. A flow control orifice is provided in the liquid inlet to reduce housing pressure, without affecting flow of liquid through the filter pack and to reduce the possibility of leaks from housings with worn parts.

12 Claims, 4 Drawing Figures

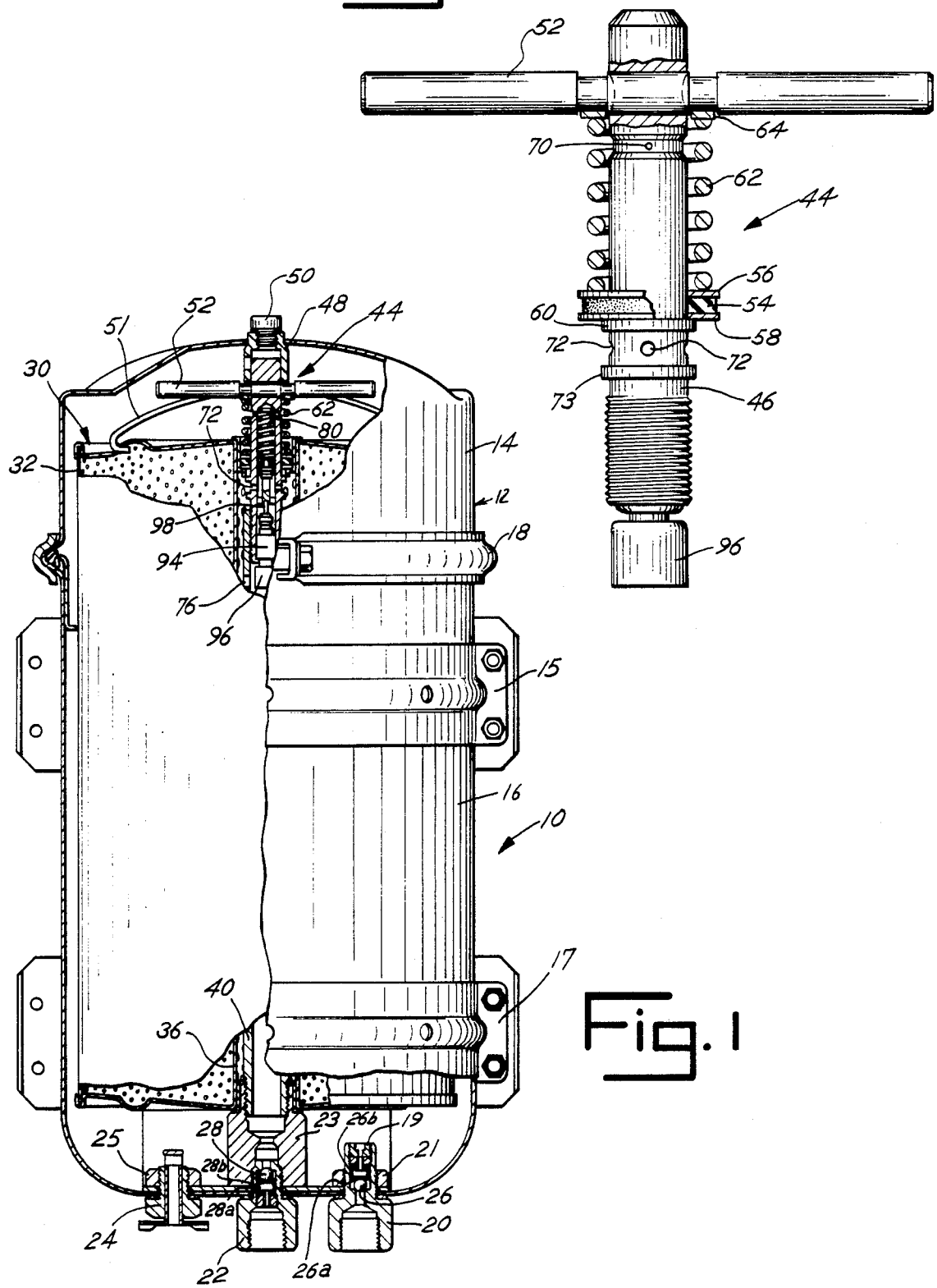

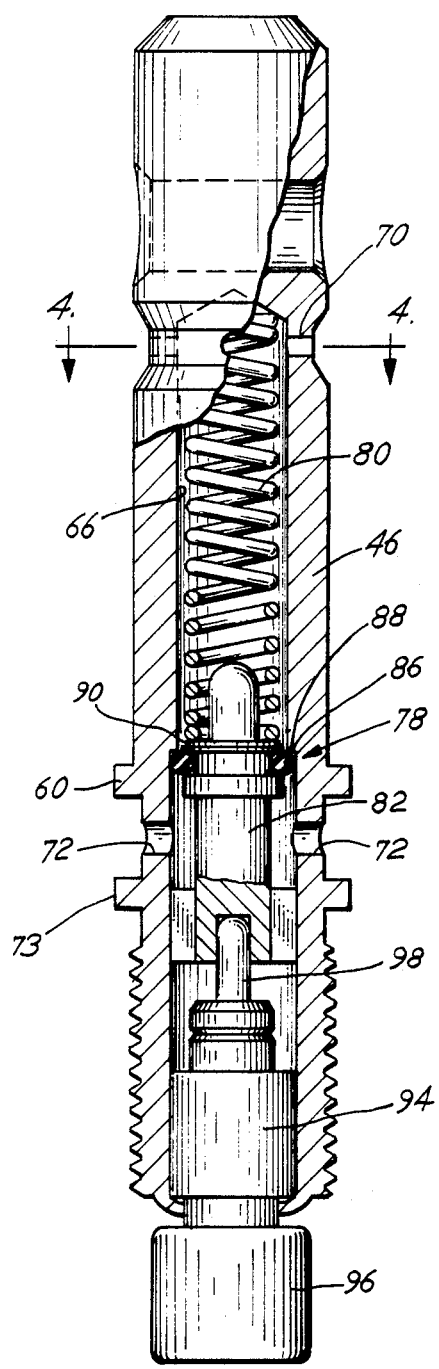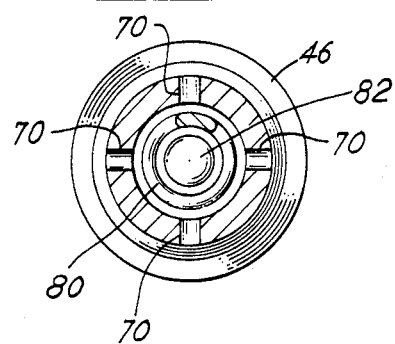

THERMOSTATICALLY CONTROLLED PACK HOLD-DOWN ASSEMBLY

BACKGROUND OF THE INVENTION

This invention relates to liquid filtration and more particularly to an improved filter for use with a pressurized oil system, e.g. with a diesel engine.

Commonly, diesel engines are provided with a pressurized oil system which includes a by-pass filter. The by-pass filter takes a portion of the oil from the oil pump outlet, filters it, and returns it to the diesel engine. The by-pass filter includes a housing with a filter pack therein. The flow rate through the filter pack is determined by resistance to fluid flow. The filter pack is rather dense, for example, wood chips and ground cellulose within a cylindrical metal shell, and forms fine pathways for removing finely dispersed contaminates from fluid flow. It is relatively hard to force oil through the filter pack, particularly when the oil is cold. When the oil is wormed, the viscosity is reduced and it is easier for oil to flow through the filter pack. To increase the speed of filter pack warm up, a by-pass hole or orifice is provided in a cylindrical member extending within the filter pack and communicating with an oil outlet from the housing. When the oil is cold, it will take the path of least resistance and flow from the oil inlet in the housing, through the by-pass orifice, and exit the housing through the oil outlet. As the oil is warmed, more oil will pass through the filter pack. At operating temperature, it is intended all oil will pass through the filter pack.

However, by-pass orifice design is presently a design tradeoff, with an attendant failure to optimize operating efficiency of the filter pack. To warm up the oil as quickly as possible, the by-pass orifice should be as big as possible. On the other hand, for highest operating efficiency, the by-pass orifice should be as small as possible to preclude by-pass of oil after the oil has reached a predetermined operating temperature. Even at or above operating temperature, some oil will bypass the filter pack, with a resultant decrease in operating efficiency of the filter pack.

To improve upon existing by-pass filters, there has been conceived a unique by-pass filter incorporating a thermostatically controlled valve means which bypasses more oil during cold starts and which bypasses no oil during normal operation, whereby the filter pack filters virtually all the oil entering the filter housing.

The by-pass filter normally includes a fluid control orifice in the cylindrical member or hold down stand. The final control orifice is relocated to the inlet fitting in the present invention so as to lower housing pressure without affecting fluid flow. Reduction in housing pressure reduces the possibility of leaks from the housing.

An object of the present invention is to provide an improved by-pass filter which overcomes deficiencies and disadvantages of prior by-pass filters.

Another object of the present invention is to provide a by-pass filter with a thermostatically controlled valve means which bypasses more oil about the filter pack during cold start than a conventional prior art by-pass filter and which bypasses no oil about the filter pack during normal operation.

Yet another object of the present invention is to provide an improved by-pass filter incorporating relatively large by-pass orifice means for passing more oil during initial or cold start of the by-pass filter and a thermostatic valve which is open at initial or cold start and which closes when the oil reaches a predetermined temperature so that no oil is bypassed and all oil passes through the filter pack and is filtered.

Still another object of the present invention is to provide an improved by-pass filter incorporating a thermostatically controlled valve means in the holddown stand and incorporating a flow control orifice in the fluid inlet.

Other objects and advantages of the invention will become more apparent hereinafter.

BRIEF DESCRIPTION OF THE DRAWING

There is shown in the attached drawing a presently preferred embodiment of the present invention, wherein like numerals in the various views refer to like elements and wherein:

FIG. 1 is a front elevation view of a by-pass filter of the present invention, with parts broken away for clarity;

FIG. 2 is an elevation view of the T-handle assembly which includes the by-pass port means and the thermostatically controlled valve means;

FIG. 3 is an enlarged view elevation of the body of the T-handle assembly, with parts broken away for clarity and with the thermostatically controlled valve means shown in the closed position; and FIG. 4 is a transverse cross-sectional view of the body of the T-handle assembly taken generally along the line 4—4 of FIG. 3.

DETAILED DESCRIPTION OF THE INVENTION

Turning to FIG. 1, there is shown a by-pass filter 10 embodying the present invention. The filter 10 includes a housing 12 has an upper section 14 and a lower section 16 joined together in fluid tight communication by a clamping ring 18. The housing may be fabricated from steel and is designed to handle intermittent high pressure surges without leaking. The lower section 16 is provided with a fluid inlet 20 and a fluid outlet 22. Also provided in the lower section 16 of the housing 12 is a bleed valve 24.

The bleed valve or drain cock body 24 is retained on housing 12 by nut fastener 25. The drain cock 24 is normally closed and can be opened for fast convenient draining of liquid from housing 12 before filter pack changes.

Bracket means 15, 17 secure the housing 12 to a suitable frame associated with the engine with which the by-pass filter is used.

The fluid inlet 20 includes a check valve 26, which functions to permit flow of fluid into housing 12, but to preclude flow of fluid from housing 12 through inlet 20. Fluid pressure opens the check valve 26. Check valve 26 is biased closed by spring 26b that bears against washer 26a that in turn abuts the ball check valve 26. Nut 21 is threaded onto a portion of the body of inlet 20 to retain it in position on housing 12. Fluid input 20 also contains a flow control orifice 19 downstream of check valve 26 to regulate oil flow to a desirable level during periods of operation at normal operating temperatures.

The fluid outlet 22 includes a check valve 28, which functions to permit flow of fluid from housing 12, but to preclude flow of fluid into the housing 12 through outlet 22. Fluid pressure opens the check valve 22. Check valve 28 is biased closed by spring 28a that bears against washer 28b that in turn abuts the ball check valve 28. Nut means 23 is threaded onto a portion of the body of outlet 22 to retain it in position on housing 12.

The filter pack 30 comprises an outlet generally cylindrical member 32 closed at the ends and having perforated side walls. At periodic intervals, the dirty filter pack 30 may be removed from the housing and replaced with a clean filter pack. The cylindrical member 32 may be comprised of a perforated metal cylindrical member closed at the ends by metal or relatively rigid plastic members to rigidify the cylindrical member and to prevent flow through the top or bottom of the filter pack 30. The cylindrical member 32 is filled with a suitable filter medium, such as wood chips and ground cellulose, which provides a plurality of very fine passageways for trapping and holding finely dispersed contaminants and impurities in the liquid passing therethrough.

The cylindrical member 32 is annular in cross section and forms a central opening 36 therethrough. Disposed in the central opening 36 is an outlet tube 40, which is secured at its lower end to nut 23. Suitable pack support means are provided at the bottom of filter pack 30 to help prevent settling of the filter pack 30 in use.

T-handle assembly or hold-down stud assembly 44 is secured to the upper end of the outlet tube 40. The hold-down stud assembly 44 includes a body or stud 46 which is threaded at its lower end. The external threads on stud 46 are complementary to and engage with internal threads in the upper end of outlet tube 40. The top of the stud 46 is retained in cuplike body 48 having an open upper end closed by vent plug 50, which is shown threadedly secured within the top of body 48. Spring 62 extends between the T-handle assembly 44 and the top of the filter pack 30 to bias the filter pack 30 downwardly and help retain it in place within housing 12. The bottom of the filter pack 30 rests upon the nut 23 and/or upon a suitable pack support means. Lid bail 51 is used to remove the filter pack 30 from the housing 12.

Handle 52 is secured transversely of the stud 46. Sealing means are carried on the stud 46 to seal the top of the outlet tube 40. As shown, the sealing means comprise a rubber seal 54 positioned between two washers 56, 58. The washer 58 engages a flange 60 on stud 46. Pull down spring 62 is positioned between washer 64 that abuts handle 52 and washer 56 that abuts seal 54. The user makes the seal by rotating handle 52 to screw the hold-down stud assembly 44 into the top of outlet tube 40.

Within stud 46 there is a passage 66, which communicates at the top with by-pass orifice inlet means 70 in the stud 46. The by-pass orifice inlet means 70 may comprise four radially disposed inlet openings in the stud 46. Also provided in stud 46 are by-pass orifice outlet means 72, which may comprise four radially disposed outlet openings in stud 46 below flange 60.

The passage 66 is normally open to fluid flow, i.e., below a predetermined temperature, the thermostatically controlled valve means 78 is biased open by spring 80. Above a predetermined temperature the thermostatically controlled valve means 78 is closed and fluid cannot pass through passage 66.

The outlet tube 40 is provided with opening means 76 comprising a plurality of ports adjacent the top of the outlet tube and the top of the outlet tube 40 is spaced from the flange 73 defined on the stud 46.

With reference to FIGS. 3 and 4, there is better shown the interior of the hold-down stud 46. The thermostatically controlled valve means 78 within stud 46 is shown in the closed position in FIG. 3, as occurs when the fluid has reached a predetermined temperature. Valve means 78 includes valve body 82 having an annular flange 84 projecting from body 82, and an O-ring 86 on the flange 84 for seating against a shoulder seat 88 in stud 46. The O-ring 86 is retained in place by washer 90, that is biased by spring 80, which abuts the interior of passage 66 at one end and washer 90 at the other end.

Temperature responsive element 94 is suitably secured within the lower end of stud 46. The sensor 96 of the temperature responsive element extends into the flow path of fluid through the outlet tube 40. A probe 98 is extensible from and retractible into the temperature responsive element 94 to actuate the valve body 82 to close the valve means and to permit opening of the valve means and to permit opening of the valve means. When the sensor 96 is cold, i.e., below the predetermined temperature, as occurs at start up operation, the probe 98 will be retracted and spring 80 will bias the valve means 78 open. O-ring 86 will be away from seat 88. Fluid can pass through orifice means 70, passage 66, and exit from orifice means 72. When the sensor 96 is warmed above the predetermined temperature, the probe 98 will be extended to move the valve body 82 against the bais of spring 80 and seat the O-ring 86, as shown. Passage 66 will be closed.

With reference to FIG. 1, the operation of the by-pass filter 10 will be fully described. At start up, the fluid, for example, oil, will enter housing 12 from the diesel engine sump via inlet means 20. The sensor 96 of the temperature responsive element 94 is below the predetermined temperature, for example, 100° F. in one application of the present invention, and the valve means 78 is open. Oil will pass through orifice means 70, passage 66, and orifice means 72 into the annular space between the interior of the filter pack 30 and the exterior of outlet tube 40 and through opening means 76 and outlet tube 40 for discharge through outlet means 22. Since oil will take the path of least resistance, no oil (or at most an insignificant amount of oil) will pass through the filter pack 30.

When the oil attains the predetermined temperature, as sensed by sensor 96, the probe 98 will be extended as shown in FIG. 3 to seat the O-ring 86 against seat 88 and close the flow path between orifice means 70 and orifice means 72. Bypass of oil is precluded and all oil entering the housing 12 through inlet means 20 must pass through filter pack 30 and be filtered before entering the outlet tube 40 through opening means 76 and discharging through outlet means 22.

Another feature of this invention is the location of the flow control orifice 19 in the inlet 20. In prior construction the flow control orifice was located within the housing, ordinarily in the hold-down stand. By locating the flow control orifice 19 in the inlet 20 housing pressure can be reduced, without affecting filter flow. This reduction in pressure within the housing reduces the possibility of leaks from housings with worn parts.

The improved by-pass filter of this invention requires less warm up time than a conventional by-pass filter having by-pass orifice means in the stud but not including thermostatically controlled valve means. Furthermore, the filtering efficiency of the by-pass filter is increased by the present invention. The relatively large orifice means in the stud provide relatively large oil bypass at start up to enhance filter pack warm up. Once the predetermined operating temperature is attained, the valve means is closed and all oil passes through the filter pack. In the prior art by-pass filter, the by-pass orifice means were always open and some oil, on the order of 10–20 percent, could by pass the filter pack and return to the engine jump without being filtered. Substantial improvements in by-pass filtration result from the present invention.

The term "oil" as used in connection with the present invention encompasses all types of oils including industrial fluids, detergent-type HD oil, straight mineral oil, synthetic oils, diesel fired oil and hydraulic fluids.

While I have shown and describe a presently preferred embodiment of the invention, the invention is limited only within the scope of the appended claims.

What is claimed is:

1. A filter assembly comprising a housing, a liquid inlet in said housing, a liquid outlet in said housing and a filter pack in said housing, characterized by thermostatically controlled valve means in said housing responsive to the temperature of the liquid in the housing and which is opened for bypassing liquid about the filter pack when the liquid is cold and viscous and which is closed when the liquid is warmed and less viscous so that all liquid will pass through the filter pack, a pack hold-down stud in said housing, said valve means being disposed in said pack hold-down stud, and a thermally responsive actuator for said valve means in said pack hold-down stud.

2. A filter assembly as in claim 1 wherein the valve means is open when the liquid is below a predetermined temperature and is closed when the liquid is at or above the said predetermined temperature.

3. A filter assembly as in claim 2 wherein the predetermined temperature is about 100° F.

4. A filter assembly as in claim 1 including by-pass orifice means in said pack hold-down stud.

5. A filter assembly as in claim 4 wherein the by-pass orifice means include inlet port means and exit port means, said valve means being between said inlet port means and said exit port means.

6. A filter assembly as in claim 5 wherein at cold start, the valve means is open to allow liquid to pass through the inlet port means, past the valve means and out the exit port means for exit from the housing through the liquid outlet.

7. A filter assembly as in claim 6 wherein when the liquid reaches a predetermined temperature of about 100° F., the valve means is closed and flow of liquid through the exit port means is precluded, whereby all liquid flows through the filter pack.

8. A filter assembly as in claim 5 including spring means for biasing the valve means open.

9. A filter assembly as in claim 5 wherein a passage in the pack hold-down stud connects the inlet port means and the exit port means and a spring disposed in the passage abuts the valve means and biases the valve means open.

10. A filter assembly as in claim 1 wherein the filter pack is annular and has an opening therethrough and an outlet tube is disposed in said opening in the filter pack.

11. A filter assembly as in claim 10 including a pack hold-down stud secured between the housing and the outlet tube, said hold-down stud having inlet and exit port means therein, and seal means on the pack hold-down stud for precluding liquid flow exterior of the pack hold-down stud between the inlet and exit port means.

12. A filter assembly as in claim 11 wherein the valve means are disposed in the pack hold-down stud between the inlet port means and the exit port means.

* * * * *